(12) United States Patent
Kim et al.

(10) Patent No.: US 9,075,866 B2
(45) Date of Patent: Jul. 7, 2015

(54) SYSTEM AND METHOD FOR PROVIDING SEARCH KEYWORD LIST

(75) Inventors: Dong Wook Kim, Seongnam-si (KR); Gun Han Park, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 155 days.

(21) Appl. No.: 13/227,001

(22) Filed: Sep. 7, 2011

(65) Prior Publication Data

US 2012/0072458 A1    Mar. 22, 2012

(30) Foreign Application Priority Data

Sep. 20, 2010    (KR) .................. 10-2010-0092436

(51) Int. Cl.
*G06F 17/30*    (2006.01)

(52) U.S. Cl.
CPC ........ *G06F 17/3064* (2013.01); *G06F 17/3097* (2013.01)

(58) Field of Classification Search
CPC ....................................... G06F 17/30
USPC ................................. 707/600–899
See application file for complete search history.

(56) References Cited

U.S. PATENT DOCUMENTS

| | | | |
|---|---|---|---|
| 8,332,748 B1 * | 12/2012 | Karam ........................... | 715/246 |
| 2002/0077808 A1 * | 6/2002 | Liu et al. ....................... | 704/10 |
| 2007/0296615 A1 * | 12/2007 | Raguseo ........................ | 341/51 |
| 2008/0155464 A1 * | 6/2008 | Jones et al. .................... | 715/787 |
| 2010/0115402 A1 * | 5/2010 | Knaven et al. ................ | 715/261 |
| 2012/0159317 A1 * | 6/2012 | Di Cocco et al. ............. | 715/261 |

FOREIGN PATENT DOCUMENTS

| | | |
|---|---|---|
| JP | 2009-506429 | 2/2009 |
| KR | 10-2006-0093208 | 8/2006 |
| KR | 10-2007-0111275 | 11/2007 |
| KR | 10-2009-0120442 | 11/2009 |
| KR | 10-0993198 | 5/2010 |
| KR | 10-2010-0091579 | 8/2010 |
| WO | WO 2010/005798 A2 | 1/2010 |

OTHER PUBLICATIONS

Japanese Office Action issued in corresponding Japanese App. No. 2011-204317, dated Dec. 2, 2014.

* cited by examiner

*Primary Examiner* — Isaac M Woo
(74) *Attorney, Agent, or Firm* — Greer Burns & Crain Ltd.

(57) ABSTRACT

A method and system for providing a search keyword list are provided. The search keyword list providing system includes an initial letter receiving unit to receive at least one initial letter from a user terminal; a list providing unit to provide a first search keyword list that contains at least one automatically completed search keyword related to the at least one initial letter; and a middle letter receiving unit to receive a middle letter related to any one of the at least one initial letter from the user terminal, wherein the list providing unit provides the user terminal with a second search keyword list that contains at least one automatically completed search keyword related to the at least one initial letter and the middle letter when receiving the middle letter.

12 Claims, 3 Drawing Sheets

SYSTEM AND METHOD FOR PROVIDING SEARCH KEYWORD LIST

CROSS REFERENCE TO RELATED APPLICATION

This application claims priority from and the benefit of Korean Patent Application No. 10-2010-0092436, filed on Sep. 20, 2010, which is hereby incorporated by reference for all purposes as if fully set forth herein.

BACKGROUND

1. Field of the Invention

Exemplary embodiments of the present invention relate to a system and method for providing a search keyword list, and more particularly, to a system and method for providing an automatically completed search keyword list as desired by a user upon input of only an initial letter or a middle letter.

2. Discussion of the Background

With an increase in use of the Internet, the number of user searches is rapidly increasing. However, it is difficult for a search service provider to meet the varied needs of all users. Also, it is demanded of the search service provider to provide convenience of searching, by suggesting the whole search keyword when a user inputs only part of the search keyword, although, the user is knowledgeable of the whole search keyword.

Accordingly, a technology for providing an automatically completed search keyword has been suggested. That is, the search efficiency may be increased by providing the user with the whole search keyword even though the user inputs only part of the search keyword. More specifically, in the case of a user whose search ability is relatively poor, the search capability may be supplemented by providing the whole search keyword upon input of only part of the search keyword. For a user who is adept at searching, the searching becomes more convenient since the whole search keyword is provided without input of the whole search keyword.

As smart phone technology having Internet functionality is becoming more widespread, an interface for the automatic completion search needs to be changed. That is, whereas a conventional method of providing the auto-complete search function may be generally used for a personal computer (PC), there is a need for a new method for providing an interface capable of more effectively providing an automatically completed search keyword in a smart phone and the like, that is, under the conditions of a limited display space and a relatively inconvenient key input system.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a system and method to efficiently provide an automatically completed search keyword, as desired by a user.

Exemplary embodiments of the present invention also provide a system and method to efficiently provide an automatically completed search keyword corresponding to an initial letter input by the user and then providing an automatically completed search keyword corresponding to the initial letter, a middle letter, and an ending letter upon additional input of the middle letter or at least one of the middle letter and the ending letter.

Additional features of the invention will be set forth in the description which follows, and in part will be apparent from the description, or may be learned by practice of the invention.

An exemplary embodiment of the present invention discloses a search keyword list providing system including a non-transitory memory to store a database comprising automatically completed search keywords, an initial letter receiving unit to receive at least one initial letter from a user terminal, a list providing unit to provide a first search keyword list that contains an automatically completed search keyword read out from the memory related to the at least one initial letter, and a middle letter receiving unit to receive a middle letter related to any one of the at least one initial letter from the user terminal, wherein the list providing unit provides the user terminal with a second search keyword list read out from the memory that contains an automatically completed search keyword related to the at least one initial letter and the middle letter when receiving the middle letter.

An exemplary embodiment of the present invention also discloses a search keyword list providing method including receiving at least one initial letter from a user terminal, and providing a first search keyword list that contains an automatically completed search keyword related to the at least one initial letter.

An exemplary embodiment of the present invention also discloses a search keyword list providing system which provides a program executed by a user terminal, the program including receiving an input of at least one initial letter through an interface of the user terminal, displaying a first search keyword list containing an automatically completed search keyword related to the at least one initial letter, through a display unit of the user terminal, receiving an input of a middle letter related to any one of the at least one initial letter through the interface of the user terminal, and displaying a second search keyword list containing an automatically completed search keyword related to the at least one initial letter and the middle letter, through the display unit of the user terminal.

An exemplary embodiment of the present invention also discloses a user terminal including an initial letter receiving unit to receive at least one initial letter from a user terminal, a list providing unit to provide a first search keyword list that contains an automatically completed search keyword related to the at least one initial letter, and a middle letter receiving unit to receive a middle letter related to any one of the at least one initial letter. Here, the list providing unit may provide the user terminal with a second search keyword list that contains an automatically completed search keyword related to the at least one initial letter and the middle letter when receiving the middle letter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
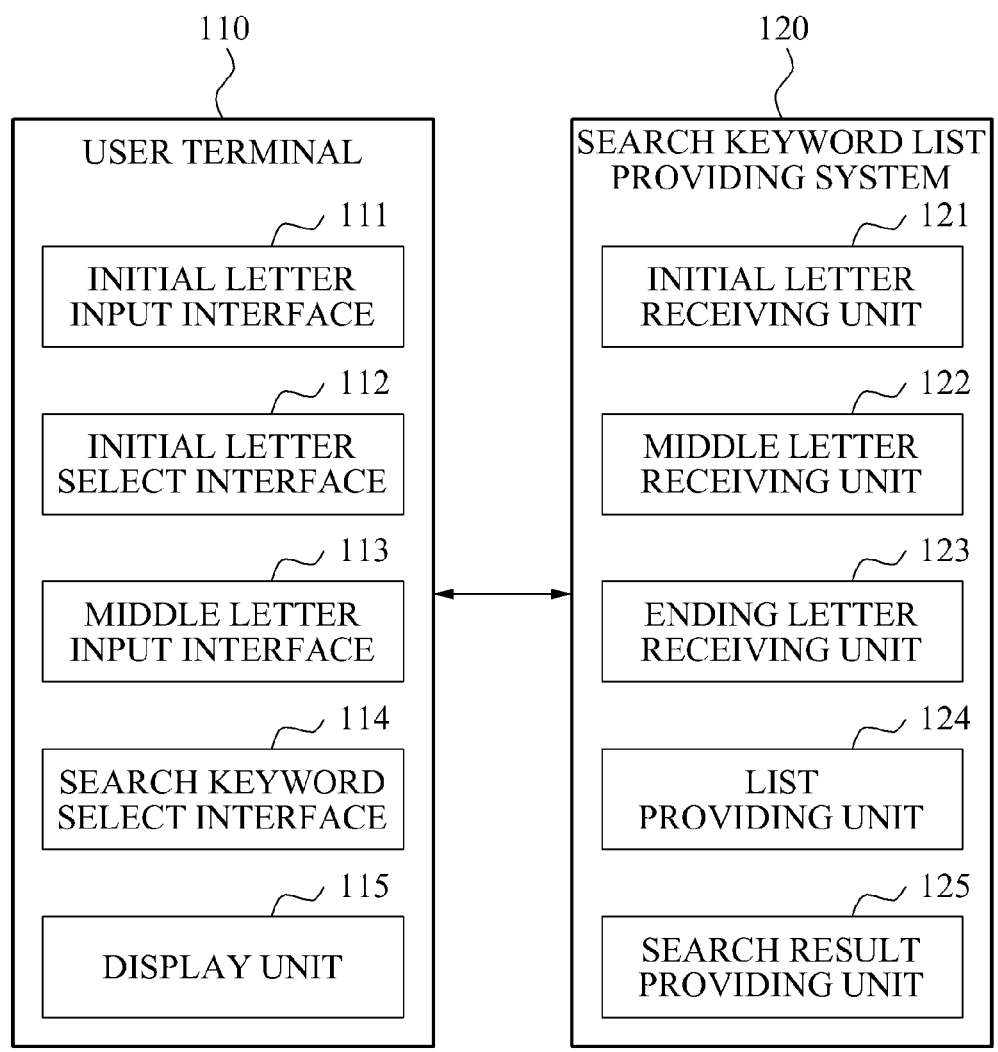
FIG. 1 is a block diagram illustrating a structure of a search keyword list providing system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures. A search keyword list providing method according to the embodiments of the present invention may be performed by a search keyword list providing system.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, or Z" can be construed as X only, Y only, Z only, or any combination of two or more items X, Y, and Z (e.g., XYZ, XYY, YZ, ZZ).

FIG. 1 is a block diagram illustrating a structure of a search keyword list providing system 120 according to an embodiment of the present invention.

The search keyword list providing system 120 may provide a first search keyword list that contains at least one automatically completed search keyword related to an initial letter received from a user terminal 110. Here, the first search keyword list may contain the automatically completed search keyword desired by a user. According to the present invention, the user terminal 110 is accessible to the search keyword list providing system 120 through wireless communication and includes various types of interfaces.

When the first search keyword list does not contain the search keyword desired by the user, the search keyword list providing system 120 may additionally receive a middle letter related to the initial letter. Therefore, the search keyword list providing system 120 may provide the user terminal 110 with a second search keyword list that contains at least one automatically completed search keyword related to the initial letter and the middle letter. In this case, since the search keyword desired by the user becomes more specific by the middle letter, the second search keyword list has a higher possibility of containing the search keyword desired by the user than the first search keyword list.

Referring to FIG. 1, the search keyword list providing system 120 may include an initial letter receiving unit 121, a middle letter receiving unit 122, an ending letter receiving unit 123, a list providing unit 124, and a search result providing unit 125.

The initial letter receiving unit 121 may receive an initial letter from the user terminal 110. Here, the initial letter refers to at least one opening letter of at least one word constituting the search keyword to be input and searched by the user. For example, when the user intends to input "Santa Clara University" as the search keyword, the initial letter receiving unit 121 may receive three initial letters "C U" from the user terminal 110. However, the initial letter may include a letter that is not an opening letter of a word. For example, when the user intends to input "Santa Clara University" as the search keyword, the initial letter receiving unit 121 may receive three initial letters "S T C" from the user terminal 110 where "S" and "T" are spaced apart within one word "Santa". While a space is shown between the initial letters, a space is not required in all aspects. Further, the initial letter may be other than in a first word of a search keyword. For example, when the user intends to input "Santa Clara University" as the search keyword, but cannot remember the first word "Santa", the initial letter receiving unit 121 may receive two initial letters "C U" from the user terminal 110.

More specifically, the initial letter receiving unit 121 may receive the initial letter through an initial letter input interface 111 of the user terminal 110. The initial letter input interface 111 may be a keyboard type interface. To be more specific, the initial letter input interface 111 may include any one of a QWERTY keyboard type interface built in the user terminal 110, a keyboard type interface that may be connected to the user terminal 110, and a keyboard type interface displayed on a touch display unit 115 of the user terminal 110.

Then, the list providing unit 124 may provide the first search keyword list containing the at least one automatically completed search keyword related to the initial letter being input, to the user terminal 110. The user terminal 110 may display the first search keyword list through the display unit 115. When the first search keyword list displayed on the display unit 115 contains the search keyword desired by the user, the user may select the desired search keyword through a search keyword select interface 114 so that the desired search keyword is provided.

However, when the first search keyword list does not contain the desired search keyword, the user may additionally input a middle letter related to the initial letter already input, through a middle letter input interface 113, so that the desired search keyword becomes more specific. (Herein, the middle letter refers to at least one letter following the initial letter.) First, the user may select any of the initial letters corresponding to the middle letter to be input, using an initial letter select interface 112. Here, at least one initial letter may be selected.

Next, the middle letter receiving unit 122 may receive, from the user terminal 110, the middle letter related to the any of the initial letters received by the initial letter receiving unit 121, such as the initial letter selected using the initial letter select interface 112. That is, the middle letter received by the middle letter receiving unit 122 may be limited by the initial letter already received.

Next, the list providing unit 124 may provide the user terminal 110 with a second search keyword list that contains the at least one automatically completed search keyword related to the initial letter and the middle letter. The display unit 115 displays the second search keyword list and, therefore, the automatically completed search keyword may be selected from the second search keyword list through the search keyword select interface 114. Here, the automatically completed search keyword in the second search keyword list, related to the initial letter and the middle letter, may more likely to be selected by the user than the automatically completed search keyword in the first search keyword list, related to only the initial letter.

Here, the middle letter input interface 113 may be a touch-type interface enabling the user to more efficiently input the middle letter corresponding to the initial letter. In this case, the middle letter input interface 113 may recognize the middle letter input directly by the user through optical character recognition (OCR).

In addition, when the second search keyword list does not contain the desired search keyword, the user may additionally input an ending letter related to the initial letter and the middle letter through the initial letter input interface 111 so that the desired search keyword becomes more specific. First, through the initial letter input interface 111, the user may select any of the initial letters combined with the middle letter, corresponding to the ending letter to be input. Here, at least one initial letter may be selected. For example, in a state where "C U" is input through the initial letter input interface 111, the user may input 'ant' and 'lar' after 'S' and 'C' respectively, using the middle letter input interface 112 so that the display unit 115 displays "Sant Clar U." However, where "S T C" is input through the initial letter input interface 111, the user may input 'an' and 'lar' after 'S' and 'C' respectively, using the middle letter input interface 112 so that the display unit 115 displays "Sant Clar U." Further, where "U C" is input through the initial letter input interface 111, the user may input 'lar' after 'C', using the middle letter input interface 112 so that the display unit 115 displays "Clar U." Then, the user may select one of "Sant" and "Clar" which are combinations of the initial letter and the middle letter, and correspondingly input the ending letter.

The user terminal 110 may be input with the ending letter corresponding to the initial letter selected by the initial letter select interface 112, through the initial letter input interface 111. The user terminal 110 may further include an ending letter input interface (not shown). In this case, the user terminal 110 may be input with the ending letter related to the corresponding initial letter and middle letter through the ending letter input interface when the initial letter selected through the initial letter select interface 112 is combined with the middle letter.

Therefore, the ending letter receiving unit 123 may further receive an ending letter related to any one of the middle letter received by the middle letter receiving unit 122, such as the initial letter combined with the middle letter selected by the initial letter select interface 112. That is, the ending letter received by the ending letter receiving unit 123 may be limited by the middle letter already received.

Next, the list providing unit 124 may provide the user terminal 110 with a third search keyword list that contains at least one automatically completed search keyword related to the initial letter, the middle letter, and the ending letter. Therefore, the display unit 115 displays the third search keyword list for selection of the automatically completed search keyword from the third search keyword list through the search keyword select interface 114. Here, the automatically completed search keyword related to the initial letter, the middle letter, and the ending letter and contained in the third search keyword list may more likely be selected by the user than the automatically completed search keyword related to only the initial letter and contained in the first search keyword list and the automatically completed search keyword related to the initial letter and the middle letter and contained in the second search keyword list.

When any of the at least one automatically completed search keywords is selected from the first search keyword list or the second search keyword list, the search result providing unit 125 may provide the user terminal 110 with a search result corresponding to the selected search keyword. Accordingly, the display unit 115 of the user terminal 110 may display the search result.

Figure 2:
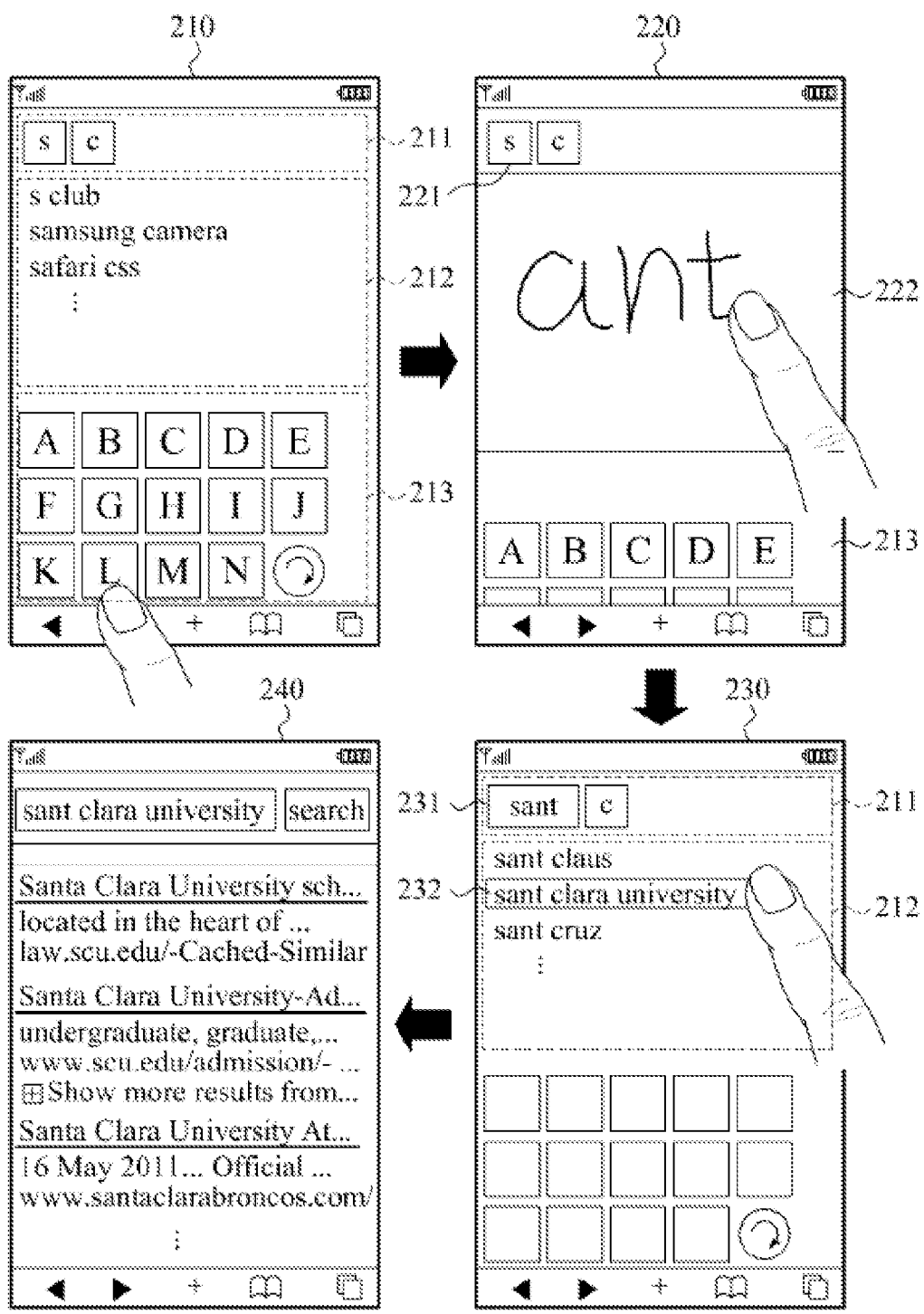
FIG. 2 is a diagram illustrating operational processes of a search keyword list providing system according to an exemplary embodiment of the present invention.

FIG. 2 is a diagram illustrating operational processes of a search keyword list providing system according to an exemplary embodiment of the present invention.

FIG. 2 illustrates an example where the user searches "Santa Clara University" as the search keyword. In operation 210, the user terminal 110 may be input with an initial letter through an initial letter input interface 213 which is a keyboard type interface. In FIG. 2, it is presumed, as an example, that the user inputs "C" as the initial letters. However, the user may input "C U", that is, all the initial letters of "Santa Clara University." The initial letter input by the user may be checked through the initial letter select interface 211.

Therefore, the search keyword list providing system 120 may provide the user terminal 110 with a first search keyword list containing at least one automatically completed search keyword corresponding to the initial letter. The user terminal 110 may display the first search keyword list provided by the search keyword list providing system 120 through a display window 212.

In the example of FIG. 2, "Santa Clara University" is the search keyword desired by the user but is not contained in the first search keyword list. In operation 220, the user may select one of the initial letters, leading a middle letter to be input, through the initial letter select interface 211. Referring to FIG. 2, the user selects "S" 221 through the initial letter select interface 211 to limit the search keyword list to contain "Sant", and inputs "ant" as the middle letter through a middle letter input interface 222.

In operation 230, the initial letter select interface 211 shows "Sant C" that is a combination of the initial letters and the middle letters. Accordingly, a second search keyword list containing at least one automatically completed search keyword related to "Sant C" is shown through the display window 212. The user may select "Santa Clara University" which is a desired search keyword 232 from the second search keyword list.

Next, as shown in operation 240, the user terminal 110 may be provided with a search result with respect to "Santa Clara University" by the search keyword list providing system 120 and display the search result through the display window 212.

In operation 230, when the automatically completed search keyword desired by the user is not contained in the second search keyword list, operation 220 may be repeated.

Therefore, according to the embodiment of the present invention, the user is provided with the desired search keyword "Santa Clara University" by inputting only a part of the search keyword, that is, only the initial letter or the initial letter with the middle letter, without having to input the whole search keyword.

Figure 3:
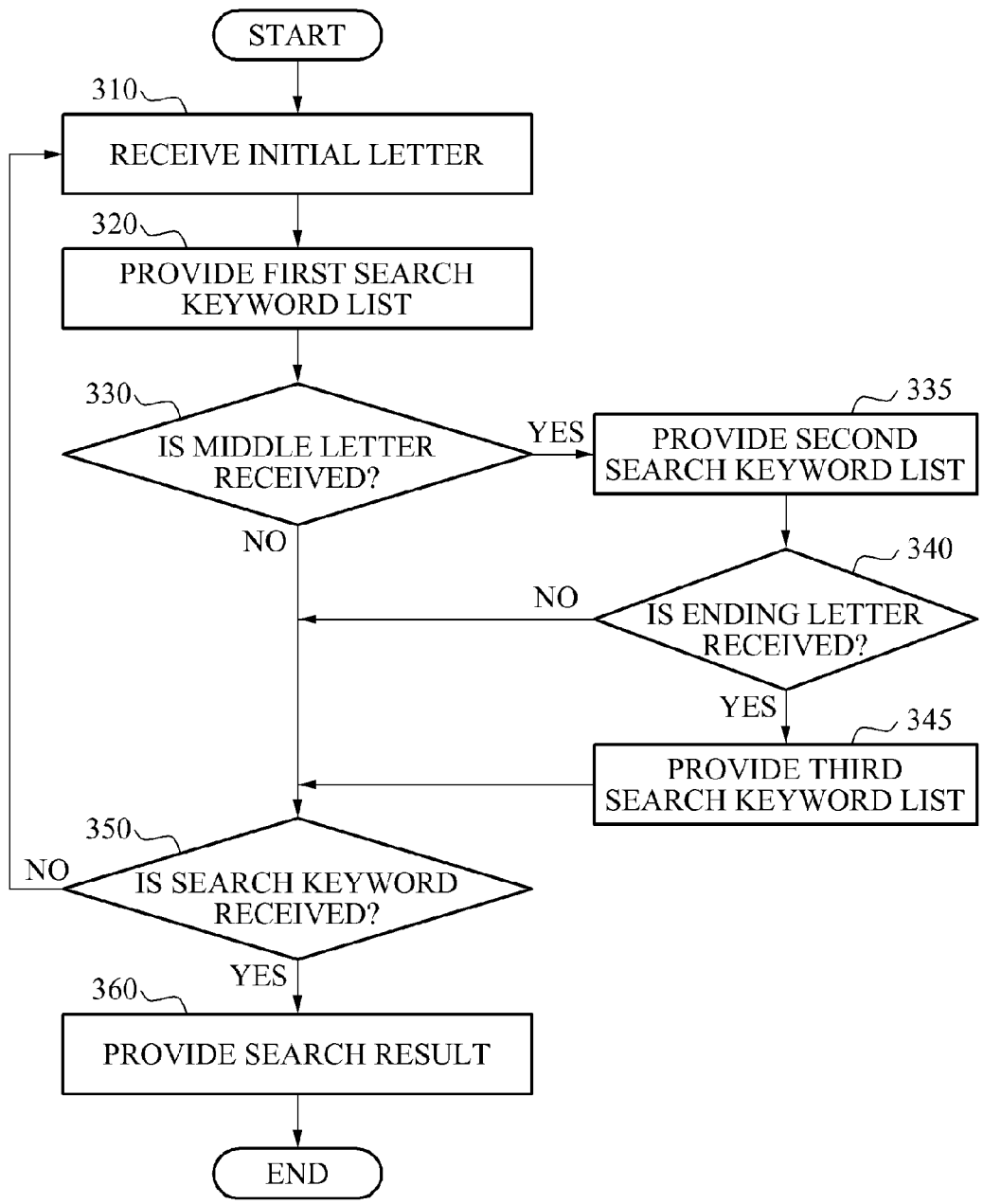
FIG. 3 is a flowchart illustrating a search keyword list providing method according to an exemplary embodiment of the present invention.

FIG. 3 is a flowchart illustrating a search keyword list providing method according to an embodiment of the present invention.

In operation 310, the initial letter receiving unit 121 of the search keyword list providing system 120 may receive an initial letter from the user terminal 110. More specifically, the initial letter receiving unit 121 may receive the initial letter input through a keyboard-type interface from the user terminal 110.

In operation 320, the list providing unit 124 of the search keyword list providing system 120 may deduce at least one automatically completed search keyword related to the initial letter received in operation 310, through a search keyword database (DB) prepared in advance and provide the first search keyword list to the user terminal 110.

In operation 330, the middle letter receiving unit 122 of the search keyword list providing system 120 may determine whether the middle letter related to the initial letter is received from the user terminal 110. When the middle letter is not received, in operation 350, the search result providing unit 125 of the search keyword list providing system 120 may determine whether the automatically completed search keyword is selected from the first search keyword list and received through the user terminal 110. When the automatically completed search keyword is received, in operation 360, the search result providing unit 125 may provide the search result corresponding to the automatically completed search keyword received from the user terminal 110. Conversely, when the automatically completed search keyword is not received, the search keyword list providing system 120 returns to operation 310.

When the middle letter is received from the user terminal 110, the list providing unit 124 may provide the user terminal 110 with a second search keyword list containing at least one automatically completed search keyword related to the initial letter and the middle letter in operation 335. At operation 340, the ending letter receiving unit 123 of the search keyword list providing system 120 may determine whether the ending letter related to the initial letter and the middle letter is received from the user terminal 110. When the ending letter is not received, in operation 350, the search result providing unit 125 of the search keyword list providing system 120 may determine whether the automatically completed search keyword is selected from the second search keyword list and received through the user terminal 110. When the ending letter is received from the user terminal 110, the list providing unit 124 may provide the user terminal 110 with a third search keyword list containing at least one automatically completed search keyword related to the initial letter, the middle letter and the ending letter in operation 345. Here, in operation 350, the search result providing unit 125 may determine whether the automatically completed search keyword is selected from the third search keyword list and received through the user terminal 110.

When the automatically completed search keyword is received, in operation 360, the search result providing unit 125 of the search keyword list providing system 120 may provide the search result corresponding to the automatically completed search keyword received from the user terminal 110. Conversely, when the automatically completed search keyword is not received, the search keyword list providing system 120 returns to operation 310.

According to the embodiment of the present invention, an automatically completed search keyword corresponding to an initial letter input by a user is provided and, when a middle letter or at least one of the middle letters and an ending letter is additionally input by the user, an automatically completed search keyword corresponding to the initial letter, the middle letter, and the ending letter is provided. Therefore, the automatically completed search keyword desired by the user may be efficiently provided.

According to another embodiment, a user terminal may include an initial letter receiving unit to receive an initial letter, a list providing unit to provide a first search keyword list containing at least one automatically completed search keyword related to the initial letter, and a middle letter receiving unit to receive a middle letter related to any of the initial letter. The list providing unit may provide a second search keyword list containing at least one automatically completed search keyword related to the initial letter and the middle letter when receiving the middle letter.

Additionally, the user terminal may further include an ending letter receiving unit to receive an ending letter related to the middle letter. Upon receiving the ending letter, the list providing unit of the user terminal may provide a third search keyword list containing at least one automatically completed search keyword related to the initial letter, the middle letter, and the ending letter.

According to another embodiment, the search keyword list providing system may provide a program to the user terminal. Here, the program may include operations of receiving an input of an initial letter through an interface of the user terminal; displaying a first search keyword list containing at least one automatically completed search keyword related to the initial letter, through a display unit of the user terminal; receiving an input of a middle letter related to any of the initial letters input through the interface of the user terminal; and displaying a second search keyword list containing at least one automatically completed search keyword related to the initial letter and the middle letter, through the display unit of the user terminal.

Additionally, the program may further include receiving an ending letter related to the middle letter from the user terminal. Upon receiving the ending letter, the program may provide a third search keyword list containing at least one automatically completed search keyword related to the initial letter, the middle letter, and the ending letter.

According to embodiments of the present invention, an automatically completed search keyword is provided corresponding to an initial letter input by a user and then an automatically completed search keyword is provided corresponding to the initial letter, a middle letter, and an ending letter upon additional input of the middle letter or at least one of the middle letter and the ending letter. Accordingly, an automatically completed search keyword is more efficiently provided as desired by the user.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, using at least one processor, for generating a search phrase, comprising:
   receiving a plurality of initial letters including a first letter of each of at least two query words, and one or more letters, which are not the first letters, from one or more of the query words;
   generating, in response to receiving the plurality of initial letters, a first search keyword list having at least one search keyword entry, each search keyword entry having a first plurality of search keywords corresponding to the plurality of initial letters, wherein each search keyword corresponds to one of the plurality of initial letters in at least one-to-one correlation;
   receiving at least one middle letter related to at least one of the plurality of initial letters;
   generating, in response to receiving the at least one middle letter, a second search keyword list having at least one second search keyword entry, each second search keyword entry having a second plurality of search keywords, at least one of the second plurality of search keywords being related to at least one of the plurality of initial letters and the at least one middle letter; and
   providing the at least one second search keyword entry as the search phrase when selected by a user.

2. The method of claim 1, further comprising:
   receiving an ending letter related to the at least one middle letter; and
   generating, in response to receiving the ending letter, a third search keyword list having at least one third search keyword entry, each third search keyword entry having a third plurality of search keywords, at least one of the third plurality of search keywords being related to at least one of the plurality of initial letters, the at least one middle letter, and the ending letter.

3. The method of claim 2, further comprising:
   receiving, from the user, selection of a third search keyword entry from the third search keyword list; and
   providing, in response to receiving the selection, a search result related to the selected third search keyword entry.

4. The method of claim 1, wherein:
   the plurality of initial letters is received at a terminal via a first interface type associated with the terminal; and
   the at least one middle letter is received at the terminal via a second interface type.

5. The method of claim 1, further comprising:
   receiving, from the user, selection of a second search keyword entry from the second search keyword list; and
   providing, in response to receiving the selection, a search result related to the selected second search keyword entry.

6. A non-transitory computer readable recording medium comprising at least one program that when executed is configured to cause the at least one processor to implement the method of claim 1.

7. The method of claim 1, wherein the plurality of initial letters are received at a terminal, the method further comprising:
   transmitting, via at least one communication network, the plurality of initial letters to a server providing a search service; and
   receiving, in response to transmitting the plurality of initial letters, the first search keyword list from the server; and
   transmitting, in response to receiving the first search keyword list from the server, the first search keyword list to the terminal via at least one communication network.

8. The method of claim 7, further comprising:
   receiving, at the server providing the search service, the plurality of initial letters.

9. The method of claim 1, further comprising:
   receiving a selection by the user of the at least one of the plurality of initial letters; and
   associating, based on the selection, the at least one middle letter with the selected at least one of the plurality of initial letters.

10. The method of claim 1, wherein the plurality of initial letters is received as a string without a space between at least two initial letters of the plurality of initial letters.

11. The method of claim 1, wherein the plurality of initial letters is received as a string, the string comprising at least one space between at least two initial letters of the plurality of initial letters.

12. A method, using at least one processor, for generating a search phrase, comprising:
   receiving a plurality of initial letters including one or more letters, which are not first letters of one or more query words, from one or more of the query words;
   generating, in response to receiving the plurality of initial letters, a first search keyword list having at least one search keyword entry, each search keyword entry having a first plurality of search keywords corresponding to the plurality of initial letters, wherein each search keyword corresponds to one of the plurality of initial letters in at least one-to-one correlation;
   receiving at least one middle letter related to at least one of the plurality of initial letters;
   generating, in response to receiving the at least one middle letter, a second search keyword list having at least one second search keyword entry, each second search keyword entry having a second plurality of search keywords, at least one of the second plurality of search keywords being related to at least one of the plurality of initial letters and the at least one middle letter; and
   providing the at least one second search keyword entry as the search phrase when selected by a user.

* * * * *